United States Patent [19]

Nakagawa et al.

[11] 4,270,953

[45] Jun. 2, 1981

[54] TWO COMPONENT ANTIFOULING PAINT

[75] Inventors: Keizo Nakagawa; Katsushi Yamano; Takashi Watanabe; Kunio Yamamoto; Shigeo Inomata, all of Hiratsuka, Japan

[73] Assignee: Kansai Paint Co., Ltd., Amagasaki, Japan

[21] Appl. No.: 18,049

[22] Filed: Mar. 6, 1979

[30] Foreign Application Priority Data

Mar. 9, 1978 [JP] Japan .................................. 53-27512
Jun. 9, 1978 [JP] Japan .................................. 53-68958

[51] Int. Cl.³ .............................................. C09D 5/14
[52] U.S. Cl. ........................................ 106/16; 106/18; 106/18.34; 106/18.35; 106/137; 106/214; 106/241; 260/37 EP; 260/37 M; 260/37 N; 260/38; 260/40 R; 260/42.22; 424/141; 424/143; 424/288
[58] Field of Search ................... 106/16, 17, 18, 18.34, 106/18.35, 137, 214, 241; 424/288, 141, 143; 260/37 EP, 38, 40 R, 42.22, 37 N

[56] References Cited

U.S. PATENT DOCUMENTS

| | | | |
|---|---|---|---|
| 3,615,744 | 10/1971 | Yokoo et al. .......................... | 106/16 |
| 3,684,752 | 8/1972 | Goto et al. .......................... | 106/18.35 |
| 3,794,501 | 2/1974 | De Nio .............................. | 106/18.35 |
| 3,885,039 | 5/1975 | Pinkowski et al. ..................... | 106/16 |
| 3,912,519 | 10/1975 | Takagi et al. ......................... | 106/16 |
| 3,979,354 | 9/1976 | Dyckman et al. ..................... | 106/18.35 |
| 4,021,392 | 5/1977 | Milne et al. ........................ | 106/18.35 |
| 4,104,234 | 8/1978 | Bernarski et al. .................. | 106/18.35 |

FOREIGN PATENT DOCUMENTS

| | | |
|---|---|---|
| 40-21426 | 9/1965 | Japan . |
| 48-1414 | 1/1973 | Japan . |
| 1062324 | 5/1967 | United Kingdom . |
| 1509250 | 3/1978 | United Kingdom . |

*Primary Examiner*—Lorenzo B. Hayes
*Attorney, Agent, or Firm*—Wenderoth, Lind & Ponack

[57] ABSTRACT

This invention provides a novel antifouling paint which has excellent storage stability for a long period of time and which affords a coated film having antifouling properties for a long period of time. The paint comprises two components, Component A and Component B, said Component A and said Component B being in separate packages which are mixed before application, wherein Component A contains organotin polymer as antifouling ingredient, and wherein Component B comprises vehicle resin and copper antifoulant.

35 Claims, No Drawings

TWO COMPONENT ANTIFOULING PAINT

This invention relates to an antifouling paint of the two component or package type. More particularly, this invention relates to antifouling paint of two component type which is characterized in that the paint comprises a pair of components, that is, one component containing organotin polymer as antifouling agent, and the other component comprising a vehicle resin and copper antifoulant. Furthermore, the present invention relates to an antifouling paint of two package type which is used by mixing the two components together before application.

Ships and marine structures generally suffer severe damage from fouling, caused by a variety of marine life. When ships or vessels are fouled with some marine life, the frictional resistance between the hulls and seawater increases, and a decrease of speed and an increase of fuel consumption may occur as a result. Therefore, the fouling brings about serious economical loss, and further, it also causes an undesirable effect from the standpoint of corrosion inhibition. Thus, in order to prevent or substantially mitigate such fouling by marine life, antifouling paint, the so-called "ship-bottom" paint, is applied to the marine structures.

The antifouling paint generally comprises vehicle and antifouling agent. As the antifouling agent there have heretofore been used organic or inorganic poisons such as cuprous oxide, copper thiocyanate, copper oleate, triphenyltin hydroxide, triphenyltin chloride, tributyltin fluoride, bis(tributyltin)oxide, or tetramethylthiuram disulfide, or combinations of them.

Antifouling paints comprising organotin polymers (such as a homo- or copolymer of a trialkyltin (meth)-acrylate, or the reaction product between a high-acid value alkyd resin and a trialkyltin or triphenyltin compound) have so far been known. Of said organotin polymers, those having enduring antifouling properties require a considerable period for the triorganotin group to dissolve out by hydrolysis after dipping in seawater, and hence, are problematical in terms of their antifouling properties exhibited in the initial stage. The organotin polymers made easily hydrolyzable to alleviate such defect, on the other hand, are considerably consumed, for example, during navigation of vessels coated with the polymers, and cannot exhibit their antifouling properties for a long period of time, and further, a coated film formed from the polymer becomes highly hydrophilic and soluble, thus resulting in very poor anticorrosion properties. Also, the organotin polymer itself cannot be expected to have an effect of preventing the deposition of seaweeds, and it is known that this drawback can be alleviated greatly by the joint use of said organotin polymer with a copper antifoulant such as cuprous oxide (see, for example, Japanese Patent Publication Nos. 21426/65 and 1414/73).

We have carefully studied antifouling paints comprising combinations of organotin polymers and copper antifoulants, and found that when the antifouling paint is stored for a long period of time, its antifouling properties, in particular, lower gradually and its storage stability is seriously defective.

Generally, antifouling paints have to be shipped and transported to distant docks, and hence, it is required that they should not change in properties or lower in performances during a long period of transportation.

We have made studies on the cause of the above-mentioned drawbacks, especially, the lowering of the antifouling properties of a coated film prepared from said antifouling paint containing organotin polymer and copper antifoulant as antifouling agent. We have found, as a result, that said two components gradually react with each other in the paint during storage, thereby causing the above-mentioned antifouling property lowering phenomenon.

To avoid the occurrence of such reaction in the paint during storage, we have considered various possibilities, and then, have reached the conclusion that the most effective method is to store the organotin polymer component and the copper antifoulant component separately from each other and mix the two components together before application, and this method is also safest and most suitable for practical purposes. Such separation of components has enabled copper antifoulant to be incorporated in a large amount, thus making it possible to markedly improve the antifouling properties over those of conventional antifouling paints of one package type. Optional incorporation of triphenyltin or trialkyltin components to be described later has given further improvement in the antifouling properties.

Accordingly, it is an object of the present invention to provide an improved and useful antifouling paint which is substantially free from the above-mentioned disadvantages.

It is another object of the present invention to provide an antifouling paint of two package type which is used by mixing the two components together before application.

It is still another object of the present invention to provide an antifouling paint which has excellent antifouling and anti-algae properties as well as other good film properties.

Other objects and advantages of the present invention will become apparent from the following detailed description.

According to the present invention, there is provided an antifouling paint of Component A and Component B in separate packages which are mixed before application, wherein Component A contains organotin polymer as antifouling ingredient, and wherein Component B comprises vehicle resin and copper antifoulant. If desired, said Component A may further contain a trialkyltin or triphenyltin compound or a vehicle resin; and Component B, a trialkyltin or triphenyltin compound.

Thus, the present invention concerns an antifouling paint of the type in which a combination of organotin polymer and copper antifoulant is used as an antifouling agent, characterized in that organotin polymer component (Component A) and copper antifoulant component (Component B) are stored in separate packages and mixed before application.

The antifouling paint of the present invention will be explained in greater detail below.

COMPONENT A:

Component A contains organotin polymer, and when the organotin polymer is itself liquid, can consist essentially of the organotin polymer alone or its solution diluted with an organic solvent. When the organotin polymer is solid at room temperature, Component A can consist essentially of a solution of the organotin polymer in organic solvent. If desired, Component A can further contain assistant components such as later-described vehicle resins and triphenyltin and/or trialkyltin compounds as antifoulant, pigments, and auxiliary antifouling agents other than copper-containing compounds and triphenyltin and trialkyltin compounds. (When the triphenyltin compound and vehicle resin are used jointly, it is highly desirable that the vehicle resin be other than a carboxyl group-containing resin such as rosin.)

The organotin polymer used in Component A is a compound of the structure in which a low molecular organotin group such as a triphenyltin group or a trialkyltin group is bonded, as a pendant side chain and/or as a terminal group, to the main chain and/or side chain of a base polymer. Generally, the base polymer includes various polymers containing carboxyl or amino group and having film-forming properties. Said organotin polymer is sometimes called "Sn-polymer" hereinafter.

Typical examples of the organotin polymer (Sn-polymer) and triphenyltin or trialkyltin compound usable in the present invention include the following:

(A) Reaction product between triphenyltin or trialkyltin compound and functional polymer selected from the group consisting of high-acid value alkyd resins, high-acid value epoxy modified alkyd resins, high-acid value carboxyl group-containing vinyl homopolymers or copolymers, and polyamide resins; and (B) organotin polymer or copolymer containing units derived from the polymerizable reaction product (triphenyltin or trialkyltin modified vinyl monomer) between a triphenyltin or trialkyltin compound and a carboxyl group-containing vinyl monomer.

The triphenyltin compound used for formation of said Sn-polymer and/or for component A or B is expressed by the following general formula:

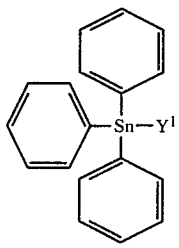
(I)

in which $Y^1$ represents, for example, —OH, halogen,

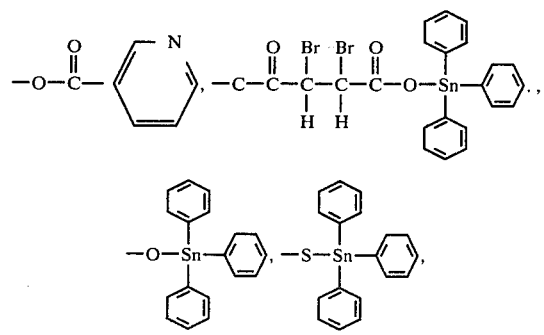

or a residue of a mono- or dibasic acid having 1 to 18 carbon atoms or halogenated derivative thereof.

The trialkyltin compound used for formation of said Sn-polymer and/or for Component A or B is expressed by the following general formula:

(II)

in which R represents an alkyl group having 1 to 6 carbon atoms, and $Y^2$ represents, for example,

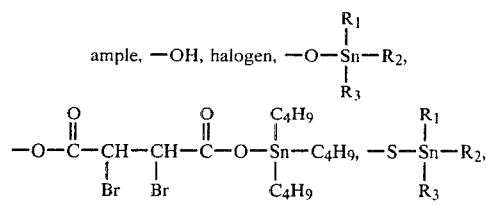

or a residue of a mono- or dibasic acid having 1 to 18 carbon atoms or halogenated derivative thereof, in which $R_1$, $R_2$ and $R_3$ each represents an alkyl group having 1 to 6 carbon atoms.

In the above formulae (I) and (II), the halogen include fluorine, chlorine, bromine and iodine, of which fluorine and chlorine are particularly suitable. The alkyl group with 1 to 6 carbon atoms of formula (II) may be either cyclic chain or straight chain or branched chain alkyl group, and includes, for example, methyl, ethyl, n- or iso-propyl, n-, iso-, sec- or tert-butyl, amyl, hexyl, and cyclohexyl, of which that having 3 to 6 carbon atoms is preferred.

Typical examples of the triphenyltin compound of the formula (I) include triphenyltin hydroxide, triphenyltin chloride, triphenyltin fluoride, triphenyltin bromide, triphenyltin iodide, triphenyltin acetate, triphenyltin monochloroacetate, triphenyltin phthalate, triphenyltin maleate, triphenyltin fumarate, triphenyltin octinate, triphenyltin stearate, triphenyltin nicotinate, triphenyltin versatate, bis-(triphenyltin) dibromosuccinate, bis-(triphenyltin) oxide, and bis-(triphenyltin) sulfide. Of these compounds, triphenyltin hydroxide, triphenyltin chloride, triphenyltin acetate, and bis-(triphenyltin) oxide are preferred.

Typical examples of the trialkyltin compound of the formula (II) include bis-(trimethyltin) oxide, trimethyltin chloride, bis-(triethyltin) oxide, triethyltin chloride, triethyltin fluoride, bis-(tripropyltin) oxide, tripropyltin chloride, tripropyltin fluoride, tributyltin chloride, tributyltin fluoride, tributyltin bromide, tributyltin iodide, tributyltin acetate, bis-(tributyltin) oxide, bis-(tributyltin) sulfide, tributyltin monochloroacetate, tributyltin stearate, tributyltin fumarate, tributyltin maleate, bis-(tributyltin) dibromosuccinate, tributyltin nicotinate, bis-(tricyclohexyltin) oxide, bis-(tricyclohexyltin) sulfide, tricyclohexyltin hydroxide, tricyclohexyltin fluoride, tricyclohexyltin chloride, and tricyclohexyltin acetate. Of these compounds tripropyltin chloride, tributyltin chloride, tributyltin fluoride, bis-(tributyltin) oxide, bis-(tripropyltin) oxide, and bis-(tricyclohexyltin) oxide are preferred.

In the present invention, the use of the triphenyltin compound cited first is preferred particularly.

Hereinafter will be explained high acid value alkyd resins, high acid value epoxy modified alkyd resins, high acid value carboxyl group-containing vinyl resins, and polyamide resins to be used for forming Sn-polymers by reaction with the above-enumerated triphenyltin or trialkyltin compounds, as well as details of the reaction between these resins and said triorganotin compounds.

(i) High acid value alkyd resins or high acid value epoxy modified alkyd resins

High acid value alkyd resins can be prepared by esterification of the polybasic acid component and the polyhydric alcohol component, if desired together with drying or semidrying oil fatty acids, by methods known per se.

Usable polybasic acid component includes, for example, phthalic acid, trimellitic acid, maleic acid, fumaric acid, citraconic acid, itaconic acid, tetrahydrophthalic acid, crotonic acid, succinic acid, adipic acid, sebacic acid, isophthalic acid, pyromellitic acid, azelaic acid, and methylene tetrahydrophthalic anhydride, and anhydrides of them, of which phthalic acid, trimellitic acid and anhydrides of these are particularly preferred. Further, monobasic acids such as p-tert-butyl benzoic acid or benzoic acid can also be used jointly with said acids.

Examples of the polyhydric alcohol component include ethylene glycol, propylene glycol, butanediol, diethylene glycol, dipropylene glycol, triethylene glycol, pentanediol, neopentyl glycol, pentaerythritol, glycerin, tetramethylene glycol, hexamethylene glycol, trimethylolethane, trimethylolpropane, and diglycerol, of which trimethylolethane, ethylene glycol and glycerin are preferred.

Examples of the drying or semidrying oil fatty acids usable as required include fatty acids such as linseed oil, soybean oil, castor oil, dehydrated castor oil, tall oil, cottonseed oil, safflower oil, hempseed oil, poppy seed oil, sunflower oil, walnut oil, corn oil, mustard oil, oiticica oil, peanut oil, perilla oil, rubberseed oil, sesame oil, and tung oil, and high-diene value fatty acid.

The high acid value epoxy modified alkyd resin may be that produced by polycondensing polybasic acid component and epoxy resin, or polybasic acid component and epoxy resin and polyhydric alcohol component, by a method known per se, if desired with a drying or semidrying oil fatty acid incorporated therein. The polybasic acid component and polyhydric alcohol component used are the same as described regarding said high acid value alkyd resins, and the epoxy resin is a resin containing a glycidyl group in the molecule, such as EPIKOTE 828, 1001 or 1004, a product of Shell Chemical Company.

The high acid value alkyd resin and high acid value epoxy modified alkyd resin usable in preparing the Sn-polymer in accordance with the present invention, advantageously, have an acid value generally of 30 to 300, preferably of 50 to 250. The reaction between such high acid value alkyd resin or high acid value epoxy modified alkyd resin and said triphenyltin or trialkyltin compound can be carried out such that when the triphenyltin compound is used, its amount is generally 0.5 to 3.0 equivalents, preferably 1.0 to 3.0 equivalents, more preferably 1.1 to 2.0 equivalents, per equivalent of the COOH group in said high acid value alkyd resin or high acid value epoxy modified alkyd resin; or when said trialkyltin compound is used, its amount is generally 0.5 to 3.0 equivalents, preferably 0.8 to 2.0 equivalents, more preferably 0.8 to 1.2 equivalents, per equivalent of the COOH group in said high acid value alkyd resin or high acid value epoxy modified alkyd resin. For instance, the reaction can be performed by reacting the alkyd resin or epoxy modified alkyd resin and the organotin compound in an organic solvent for about 1 to 3 hours at a temperature of about 40° to 200° C., preferably 50° to 150° C. This reaction may be performed by either first mixing the two components followed by heating, or while heating one of the components, adding the other component thereto. Said organic solvent includes, for example, hydrocarbons (e.g. toluene and xylene), ketones (e.g. methyl isobutyl ketone, and cyclohexanone), esters (e.g. butyl acetate, and amyl acetate) and alcohols (e.g. n- or isopropanol, and n- or isobutanol).

The above-mentioned reaction affords organotin polymer having the triphenyltin or trialkyltin compound bonded, by condensation, to the carboxyl group of the high acid value alkyd resin or high acid value epoxy modified alkyd resin.

(ii) High acid value carboxyl group-containing vinyl polymer or copolymer

High acid value carboxyl group-containing vinyl polymers usable in the present invention include homo- or copolymers of carboxyl group-containing vinyl monomers. Preferred are those having an acid value generally of 30 to 300, preferably of 50 to 250, and a number average molecular weight in the range of from about 1,000 to about 70,000 generally, and of from about 3,000 to about 30,000 preferably.

Examples of such carboxyl group-containing vinyl polymer include homopolymers of unsaturated monocarboxylic acids (such as acrylic acid, methacrylic acid, crotonic acid, vinyl acetic acid and vinyl benzoic acid) or unsaturated polycarboxylic acids (such as maleic anhydride, fumaric acid, succinic acid, citraconic acid, mesaconic acid, itaconic acid, and aconitic acid); copolymers of these monomers with one another; and copolymers of at least one of said carboxyl group-containing vinyl monomers with one or more other vinyl monomers copolymerizable therewith which will be described later.

Above all, preferred are high acid value acrylic polymers having the aforementioned acid value and molecular weight, namely, homopolymer or copolymer of acrylic acid or methacrylic acid, and copolymer of acrylic acid or methacrylic acid with other comonomer copolymerizable therewith.

Said other comonomer copolymerizable with said unsaturated carboxyl group-containing monomer is a vinyl monomer and/or oligomer that is selected, for example, from $C_1$–$C_{18}$ alkyl esters of acrylic acid, $C_1$–$C_{18}$ alkyl esters of methacrylic acid, triallyl cyanurate, acrylonitrile, methacrylonitrile, vinylpyridine, allyl alcohol, crotyl alcohol, methylbutenol, hydroxyethyl acrylate, hydroxyethyl methacrylate, hydroxypropyl acrylate, hydroxypropyl methacrylate, glycidyl acrylate, glycidyl methacrylate, vinyltoluene, styrene, vinyl acetate, vinyl chloride, divinylbenzene, ethylene, propylene, butene, butadiene, isoprene, chloroprene, and $C_1$–$C_6$ alkyl vinyl ether. These compounds can be used singly or in combinations of two or more.

Polymerization or copolymerization reaction of said carboxyl group-containing vinyl monomer or the other vinyl monomer and/or oligomer can be performed by a method known per se. The reaction of the so obtained high acid value carboxyl group-containing vinyl polymer or copolymer with said triphenyltin or trialkyltin compound can be carried out by employing the triphenyltin compound in an amount of generally 0.5 to 3.0 equivalents, preferably 1.1 to 3.0 equivalents, more preferably 1.1 to 2.0 equivalents, or the trialkyltin compound in an amount of generally 0.5 to 3.0 equivalents, preferably 0.8 to 2.0 equivalents, more preferably 0.8 to 1.2 equivalents, each of said amounts being per equivalent of —COOH in the high acid value carboxyl group-containing vinyl polymer or copolymer. The reaction can be carried out by first dispersing or dissolving said organotin compound in an organic solvent (preferably with preheating), and then performing the reaction at 40° to 200° C., preferably 50° to 150° C., for 0.5 to 10 hours, preferably 1 to 3 hours, while adding the high acid value carboxyl-group-containing vinyl polymer or copolymer to the dispersion or solution.

Thus obtained is organotin polymer having the triphenyltin or trialkyltin compound bonded, by condensation, to the carboxyl group of the carboxyl group-containing vinyl polymer or copolymer.

(iii) Polyamide resins

Suitable polyamide resins in the present invention are polyamides such as aliphatic polyamines (e.g. ethylenediamine, diethylenetriamine, triethylenetetramine, tetraethylenepentamine, and diethylaminopropylamine) and aromatic polyamines (e.g. m-phenylenediamine, p,p'-diaminodiphenylmethane, and p,p'-diaminodiphenylsulfone), or polycondensation products of these polyamines with polycarboxylic acids such as dimer acids, adipic acid, maleic acid, and phthalic acid. These polyamide resins have an amine value of 70 to 800.

A method of preparing Sn-polymer by reaction of said polyamide resin with said triphenyltin or trialkyltin compound comprises reacting them at the same temperature and for the same period of time as in the aforementioned paragraphs (i) and (ii), with the tin compound used in an amount of generally 0.3 to 2 equivalents, preferably 0.5 to 1.0 equivalent, per equivalent of the hydrogen atom of the -NH$_2$ or -NH-group in the polyamide resin.

A carboxyl group-containing vinyl monomer usable in forming triphenyltin or trialkyltin modified vinyl monomer by reaction with the organotin compound of the formula (I) or (II), on the other hand, can be a monobasic or dibasic acid having at least one ethylenic unsaturation. Its examples include polymerizable unsaturated monobasic acids such as acrylic acid, methacrylic acid, crotonic acid, vinyl benzoic acid, and vinyl acetic acid; and polymerizable unsaturated dibasic acids such as maleic acid, maleic anhydride, fumaric acid, succinic acid, citraconic acid, mesaconic acid, itaconic acid and aconitic acid. Of these, acrylic acid and methacrylic acid are preferred. There can also be used adducts of these carboxyl group-containing monomers with substances which contain $\alpha,\beta$-unsaturated groups such as diene monomers.

The reaction of the above-cited carboxyl group-containing vinyl monomer with said tin compound can be performed in accordance with a method known per se, for instance, the method described in Japanese Patent Publication No. 19956/65. In this case, if the triphenyltin compound is used as the tin compound, it is advisable to avoid the use of said polymerizable unsaturated dibasic acid.

Said carboxyl group-containing vinyl monomers (hereinafter referred to sometimes as Sn-monomer), which have the triphenyltin or trialkyltin radicals incorporated therein, can be polymerized singly or copolymerized with one another; alternatively, said Sn-monomer can be copolymerized with not more than 90% by weight of another copolymerizable monomer such as a $C_1$–$C_{18}$ alkyl ester of acrylic acid, a $C_1$–$C_{18}$ alkyl ester of methacrylic acid, triallyl cyanurate, acrylonitrile, methacrylonitrile, vinylpyridine, allyl alcohol, crotyl alcohol, methylbutenol, hydroxyethyl acrylate, hydroxyethyl methacrylate, hydroxypropyl acrylate, hydroxypropyl methacrylate, glycidyl acrylate, glycidyl methacrylate, vinyltoluene, styrene, vinyl acetate, vinyl chloride, divinylbenzene, ethylene, propylene, butene, butadiene, isoprene, chloroprene, or $C_1$–$C_6$ alkyl vinyl ether.

An Sn-polymer thus obtained can have a number average molecular weight in the range of generally about 1,000 to about 70,000, preferably about 3,000 to about 30,000.

Sn-polymer or copolymer prepared in the above-described described manner can contain triphenyltin or trialkyltin groups in an amount of generally 5 to 85 weight %, preferably 17 to 70 weight %, more preferably 18 to 65 weight %, based on the weight of the Sn-polymer or copolymer.

Component A to be used in accordance with the present invention, generally, comprises an organic solvent solution of Sn-polymer. Only organic solvent can be used that can dissolve or dilute or disperse the Sn-polymer or copolymer, for example, toluene, xylene, petroleum type mixed solvent, methyl ethyl ketone, methyl isobutyl ketone, cyclohexanone, n-butanol, isopropanol, and n-propanol, and they can be used singly or in combinations of two or more.

The concentration of Sn-polymer or copolymer in said solution is not critical, and can be varied widely according to the type of Sn-polymer or copolymer used, the type of solvent used, and so forth. It is advantageous, however, that said concentration be generally 5 to 15% by weight, preferably 10 to 90% by weight, more preferably 20 to 80% by weight, based on the weight of the solution.

COMPONENT B

Component B for use in the present invention can consist essentially of vehicle resin and copper antifoulant. If necessary, triphenyltin or trialkyltin compound may further be used jointly, but when the triphenyltin compound is used jointly, it is advisable to avoid the use, as vehicle resin, of a carboxyl group-containing resin such as rosin.

Said vehicle resin needs to be one which does not thicken or gel after it is mixed with copper antifoulant. These vehicle resins can be used singly or as a mixture of two or more. Preferably used is one which, after formation of a coated film (using said vehicle resin singly or as a mixture), has a dissolving rate in water (seawater) of not more than 1500 $\mu$g/cm$^2$/day, preferably not more than 1000 $\mu$g/cm$^2$/day, more preferably not more than 700 $\mu$g/cm$^2$/day, at 25° C.

Specific examples of the vehicle resin are filmforming resins such as rosin, rosin derivatives, natural resins, acrylic resins, alkyd resins, epoxy ester resins, vinyl resins, diene resins, olefin resins, epoxy resins, phenolic resins, petroleum resins, coumarone-indene resins, rubber resins, and plasticizers. In addition to the ordinary vehicle resins, there can be cited water-soluble or hydrophilic synthetic resins obtained by incorporating a hydrophilic group into part or whole of that resin, and naturally occurring hydrophilic compositions. As said plasticizer can be used all that are hydrophobic or hydrophilic. A more detailed exemplification of them will be given below.

(1) Rosin and rosin derivatives

Rosin and rosinates of rosin with metals such as Ca, Mg, Zn or Mn, and esters of rosin and monoalcohols or polyols or polymers containing alcohol ingredient, etc.

(2) Natural resins

Shellac, copal, dammar, bengal, gelatin, starch, gloiopeltis, etc.

(3) Acrylic resins

Non-functional acrylic resins and acrylic resins having functional groups such as —OH,, —COOH, —NH, —NH$_2$ or

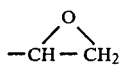

in the molecule are both usable. Preferred acrylic resins having —COOH have a number average molecular weight of about 500 to about 100,000, preferably about 1000 to about 50,000, while preferred non-functional acrylic resins and acrylic resins containing functional groups other than —COOH have a number average molecular weight of about 500 to about 80,000, preferably about 1000 to about 30,000. Specifically, preferred is a homopolymer of acrylic acid or methacrylic acid, or a copolymer of acrylic acid or methacrylic acid with another comonomer copolymerizable with it.

Examples of said other copolymerizable comonomer include unsaturated esters of monocarboxylic acids such as vinyl acetate and vinyl benzoate; unsaturated polycarboxylic acids such as maleic acid, fumaric acid, citraconic acid, mesaconic acid, itaconic acid, and aconitic acid, and their anhydrides; and other vinyl monomers such as C$_1$-C$_{18}$ alkyl esters of acrylic acid, C$_1$-C$_{18}$ alkyl esters of methacrylic acid, triallyl cyanurate, acrylonitrile, methacrylonitrile; vinylpyridine, allyl alcohol, crotyl alcohol, methylbutenol, hydroxyethyl acrylate, hydroxyethyl methacrylate, hydroxypropyl acrylate, hydroxypropyl methacrylate, glycidyl acrylate, glycidyl methacrylate, vinyltoluene, styrene, vinyl chloride, and divinylbenzene. These comonomers can be used singly or in combinations of two or more.

(4) Alkyd resins

The alkyd resins are usable that are produced by esterification of the polybasic acid component and the polyhydric alcohol component, if desired together with drying or semidrying oil fatty acids, by a method known per se, and contain —COOH and/or OH.

Examples of the usable polybasic acid component include phthalic acid, trimellitic acid, maleic acid, fumaric acid, citraconic acid, itaconic acid, tetrahydrophthalic acid, crotonic acid, succinic acid, adipic acid, sebacic acid, isophthalic acid, pyromellitic acid, azelaic acid, endomethylenetetrahydrophthalic acid, and anhydrides of these. Of them, phthalic acid, trimellitic acid and their anhydrides are particularly preferred. If necessary, a monobasic acid such as benzoic acid or p-tertbutyl benzoic acid may further be used.

Examples of the polyhydric alcohol component include ethylene glycol, propylene glycol, butanediol, diethylene glycol, dipropylene glycol, triethylene glycol, pentanediol, neopentyl glycol, pentaerythritol, glycerin, tetramethylene glycol, hexamethylene glycol, trimethylolethane, trimethylolpropane, and diglycerol, of which ethylene glycol, trimethylolethane, glycerin and pentaerythritol are preferred.

Examples of the drying or semidrying oil fatty acid usable as required include fatty acids and high diene value fatty acids such as linseed oil, soybean oil, dehydrated castor oil, cottonseed oil, safflower oil, hempseed oil, poppy seed oil, sunflower oil, walnut oil, corn oil, mustard oil, oiticica oil, peanut oil, perilla oil, rubberseed oil, seseame oil and tung oil.

(5) Epoxy ester resins

Esterification products between epoxy resins and monobasic acids. The epoxy resin used has a molecular weight of about 300 to about 8,000, and its examples include EPIKOTE 812, 828, 834, 836, 864, 1001, 1007 and 1009 (trade names for products of Shell Chemical Co.). Examples of the monobasic acid include fatty acids such as tung oil, dehydrated castor oil, soybean oil, linseed oil, safflower oil, tall oil, and castor oil; rosin acids; and butyl benzoate. The degree of esterification is not critical, but generally, it is preferably 30% or higher.

(6) Vinyl resins

Examples of the vinyl resins include homopolymers of vinyl monomers such as vinyl chloride, vinylidene chloride, vinyl acetate, vinyl propionate, styrene and acrylonitrile; copolymers of these vinyl monomers with one another; copolymers of at lest one (50 wt% or more) of said vinyl monomers with another copolymerizable monomer such as ethylene, propylene, butadiene, or vinyl isobutyl ether; and acetalized vinyl resins such as polyvinyl butyral resin. The vinyl resins have a number average molecular weight of at least 500, preferably from 1,000 to 50,000.

(7) Diene resins

Examples include homopolymers of diene monomers such a butadiene, isoprene, or chloroprene; copolymers of said diene monomers with one another; and copolymers composed of 10 wt% or more of the diene monomer and the remainder being another copolymerizable monomer such as styrene or acrylonitrile. Also included are copolymers or adducts of dienes with other resins. The diene resins have a number average molecular weight of about 5,000 or higher, preferably from 10,000 to 50,000.

(8) Olefinic resins

Examples include homopolymers of olefin monomers such as ethylene or propylene; copolymers of these olefin monomers with one another; and copolymers composed of about 20 wt% or more of the olefin monomer and the remaining proportion of another monomer such as vinyl acetate. The olefin resins suitably have a number average molecular weight of about 500 or more, particularly 10,000 or higher. Halogenated polyolefin resins (chlorinated polyethylene and chlorinated polypropylene, etc.) can also be used advantageously.

(9) Epoxy resins

The epoxy resins can be applied advantageously when the reaction product between a polyamide and an organotin compound is used as Sn-polymer. Specific examples of the epoxy resins are the same as described with reference to the epoxy ester resins of the aforementioned item (5). Also, phenoxy resin can be used.

(10) Phenolic resins

Rosin-modified phenolic resins, and resol type and novolak type phenolic or alkyl phenol resins, for instance, can be used.

(11) Petroleum resins

Obtained by polymerizing unsaturated hydrocarbon fractions having 3 or more carbon atoms, occurring as by-products during petroleum cracking. Examples include Neopolymer (a product of Nippon Oil Co., Ltd.), Petcoal (a product of Toyo Soda Manufacturing Co., Ltd.) and Quintone (a product of Nippon Zeon Co., Ltd.).

(12) Coumarone-Indene resins

Resins obtained by polymerizing coumarone-indene fraction occurring as by-product during dry distillation of coal; the resins are also usable in the present invention.

(13) Rubber resins

Examples include chlorinated rubber and cyclized rubber.

(14) Plasticizers

Examples include phosphoric ester type plasticizers such as tricresyl phosphate, triphenyl phosphate, tri-2-ethylhexyl phosphate, and monooctyldiphenyl phosphate; phthalic ester type plasticizers such as di-n-dodecyl phthalate, dinonyl phthalate, di-2-ethylhexyl phthalate, dimethyl phthalate, di-(2-ethylhexyl)tetrahydrophthalate, di-n-hexyl phthalate, diethyl phthalate, di-n-butyl phthalate, di-capryl phthalate, butyl benzyl phthalate, di-2-ethylbutyl phthalate, and isodecyl phthalate; polyester type plasticizers such as Polycizer P-29 (a product of Dainippon Ink And Chemicals, Inc.); and epoxidized oils such as Adekacizer 130P (a product of Adekaargas Chem. Co.).

The above-mentioned plasticizer can be used alone, or may be used jointly with the film-forming resin described in the preceding items (1) to (13) to adjust the strength and physical properties of a coated film prepared therefrom.

The resin usable particularly advantageously in the present invention is a relatively low molecular carboxyl group-containing resin, and a particularly preferred example is rosin. In detail, an antifouling coated film composed of Sn-polymer and copper antifoulant involves the slow dissolving of antifoulant in water (seawater), and the presence of rosin in such a system promotes the dissolving of Cu, compared with other vehicles, thereby to afford an improvement in antifouling properties. Also, when the organotin component of Sn-polymer dissolves in water (seawater) upon hydrolysis, the number of free —COOH radicals increases in the coated film, whereby the hydrophilic nature of the coated film heightens and its resistance to water decreases. If rosin having high resistance to water is present in the coated film, however, such drawbacks are not observed.

The above-described vehicle resin is used usually in the form of a solution in solvent, and copper antifoulant, the other pigment and additives are dispersed as a fine powder in said solution.

Examples of the solvent usable in dissolving the vehicle resin include aromatic hydrocarbons, such as benzene, toluene and xylene; ketones such as methyl ethyl ketone, and methyl isobutyl ketone; esters such as ethyl acetate, butyl acetate, and acetic acid ethylene glycol monoethyl ether; alcohols such as methanol, ethanol, and isopropyl alcohol; and mixtures of these solvents. They are used by suitable selection.

Copper antifoulant in Component B may be selected from cuprous oxide, copper thiocyanate, copper sulfate, copper oleate, copper rosinate, copper glycinate, metallic copper, copper alloy powder, cuprous chloride, cupric hydroxide, cupric carbonate and other copper compound having antifouling activity, and in particular, cuprous oxide, copper thiocyanate and metallic copper are preferable.

The concentration of the vehicle resin and copper antifoulant in Component B is not critical, and can be varied widely depending upon the type of the vehicle resin used and so forth. It is convenient, however, that the concentration of the vehicle resin be generally 2 to 40 wt%, preferably 4 to 35 wt%, more preferably 5 to 30 wt%, based on the weight of the Component B, and that the concentration of copper antifoulant be generally 10 to 90 wt%, preferably 20 to 90 wt%, more preferably 25 to 80 wt%, based on the weight of the Component B.

Component B can be prepared by a customary method, for example, by adding copper antifoulant, if desired triphenyltin and/or trialkyltin compound, and the other auxiliary components to a solvent solution to the vehicle resin and mixing them together.

Pigments, other auxiliary antifouling agents, anti-settling agents, anti-sagging agents, etc. can be blended with either or both of Components A and B. The pigments include, for example, loading pigments such as talc, clay, barium sulfate, and barium carbonate, and coloring pigments such as red iron oxide, zinc oxide, carbon black, Prussian blue, and chrome green. As said other auxiliary antifouling agents, organosulfur compounds such as tetramethylthiuram disulfide or zinc dimethyldithiocarbamate, 3-chloro-4-phenyl-1,2-dithiol-5-one, can be incorporated with Component A, and further, organochlorine compounds such as 2,3,5,6-tetrachloro-4-(methylsulfonyl)-pyridine, tetrachloroisophthalonitrile, N-(chlorophenyl-2,2'-dibromosuccinimide, benzene hexachloride, or DDT can be incorporated in Component A and/or B. Any other substance having antifouling properties such as organoarsenic, organomercury or organolead compounds can also be used jointly.

Components A and B, described in detail above, can be stored in separate packages, and mixed together before use, to form an antifouling paint ready for application, in accordance with the present invention. The blend proportions of Component A and Component B are not critical, and can be varied widely according to the formulation and amount of Component A and/or Component B, and so forth. It is preferred, however, to mix these components so that the content of the Sn-polymer, calculated as the weight of the triphenyltin groups or trialkyltin groups therein, is generally 0.5 to 40 wt%, preferably 0.5 to 25 wt.%, more preferably 1 to 20 wt%, based on the weight of the paint ready for application which has been prepared by mixing the components, and that the content of the copper antifoulant is generally 3 to 80 wt%, preferably 15 to 70 wt%, more preferably 20 to 60 wt%, based on said paint ready for application. Furthermore, the content of the vehicle resin in the paint ready for application can be adjusted to generally 0.5 to 40 wt%, preferably 1 to 20 wt%, and the total content of the triphenyltin and/or trialkyltin compound and auxiliary antifouling agent should desirably be adjusted to 50 wt% or less.

It is necessary to mix Components A and B within two weeks before application, and it is desirable that they be mixed within 3 days, preferably one day, before application. The mixing of Components A and B can be easily performed, for example, by means of a device such as a motorized handmixer or an air motor mixer, or by hand.

According to the antifouling paint of the present invention, the Sn-polymer component and the copper antifoulant component are stored in separate packages. That is, the antifouling paint is a two-component type paint. Therefore, it is free from the reaction of Sn-polymer with copper antifoulant during storage, never thickens during storage unlike conventional antifouling paints, involves no lowering of antifouling properties, can be stored for a long period of time, and withstands a long period of transportation. Moreover, since the claimed paint is coated immediately or relatively shortly after mixing of the two components, it solidifies upon evaporation of the volatile ingredients such as solvent. Hence, the reaction of the two antifouling components in the coated film can be minimized, and the dissolving of the antifouling components in seawater can be maintained for a long period, as compared with conventional antifouling paints, thereby affording a remarkable improvement in the antifouling properties.

The present invention will be illustrated in more detail by reference to the following examples.

PRODUCTION OF SN-POLYMER

Production Example A

An alkyd resin manufacturing closed reactor equipped with a thermometer, a stirrer and a condensed water removing device was charged with 311 parts of phthalic anhydride, 372 parts of trimethylolethane, 381 parts of dehydrated castor oil fatty acid, and 50 parts of xylene. They were heated gradually with stirring, and reacted for 5 hours at 230° C. until the resin acid value reached 10 or lower, thereby performing the first-stage esterification reaction. Condensed water generated during this period was removed from the reaction system together with xylene vapor. Then, the contents of the reactor were cooled to 180° C., and 460 parts of phthalic anhydride and 230 parts of xylene were added, followed by reacting the mixture for 1 hour at 155° C. to perform the second-stage esterification reaction. As a result, there was obtained a high acid value alkyd resin having a resin acid value of 120 (corresponding to 3.12 mols of carboxyl groups), which was diluted by addition of 410 parts of xylene. To the diluted alkyd resin solution were further added 1718 parts of triphenyltin hydroxide (corresponding to 4.68 moles of triphenyltin hydroxide) and 700 parts of xylene. The mixture was reacted under reflux for 2.5 hours at 140° to 143° C. while removing condensed water to perform the dehydrocondensation of the high acid value alkyd resin with the triphenyltin hydroxide. Dilution of the reaction mixture with xylene gave an organotin polymer A having a solids content of 60%.

Triphenyltin groups: 1.5 equivalents/equivalent of —COOH

Triphenyltin group content: 53 wt%/Sn-polymer

Production Example B

An alkyd resin manufacturing closed reactor equipped with a thermometer, a stirrer, and a condensed water removing device was charged with 387 parts of phthalic anhydride, 287 parts of trimethylolethane, 110 parts of neopentyl glycol, and 50 parts of xylene. The reaction system was heated granually with stirring and reacted at 230° C. for 5 hours until the resin acid value reached 10 or less, to perform the first-stage esterification reaction. Condensed water generated during this period was removed from the reaction system together with xylene vapor. Then, the contents of the reactor were cooled to 180° C., and further, 152 parts of phthalic anhydride and 230 parts of xylene were added. The mixture was reacted for 1 hour at 155° C. to carry out the second-stage esterification reaction. Then, 488 parts of xylene was added to dilute the reaction mixture to obtain a high acid value alkyd resin (oil-free alkyl resin) having a solids content of 60% and a resin acid value of 60 (corresponding to 1.23 moles of carboxyl groups). To the resulting product were further added 654 parts of triphenyltin acetate (corresponding to 1.6 moles of triphenyltin acetate) and 630 parts of xylene. The mixture was reacted at a temperature of 140° C. to 143° C. for 3 hours under reflux while removing condensed water, to perform the dehydrocondensation reaction of the high acid value alkyd resin with the triphenyltin hydroxide. Thereby was obtained an organotin polymer B having a solids content of 60%.

Triphenyltin groups: 1.3 equivalents/equivalent of —COOH

Triphenyltin group content: 40 wt%/Sn-polymer

Production Example C

An alkyd resin manufacturing closed reactor equipped with a thermometer, a stirrer, and a condensed water removing device was charged with 387 parts of phthalic anhydride, 337 parts of trimethylolethane, 345 parts of linseed oil fatty acid, and 50 parts of xylene. The reaction system was heated granually with stirring and reacted at 230° C. for 5 hours until the resin acid value reached 10 or less, to perform the first-stage esterification reaction. Condensed water generated during this period was removed from the reaction system together with xylene vapor. Then, the contents of the reactor were cooled to 180° C., and further, 152 parts of phthalic anhydride and 230 parts of xylene were added. The mixture was reacted for 1 hour at 155° C. to carry out the second-stage esterification reaction. Then, 488 parts of xylene was added to dilute the reaction mixture to obtain a high acid value alkyd resin having a solids content of 60% and a resin acid value of 60 (corresponding to 1.23 moles of carboxyl groups). To the resulting product were further added 298 parts of bis(-tributyltin) oxide (corresponding to 0.5 mole of bis(-tributyltin) oxide) and 100 parts of xylene. The mixture was reacted at a temperature of 140° C. to 143° C. for 2 hours under reflux while removing condensed water, to perform the dehydrocondensation reaction of the high acid value alkyd resin with the bis(tributyltin) oxide. Then, the reaction mixture was diluted with xylene to afford an organotin polymer C having a solids content of 60%.

Tributyltin groups: 0.8 equivalent/equivalent of —COOH

Tributyltin group content: 19.6 wt%/Sn-polymer

Production Example D

An alkyd resin manufacturing closed reactor equipped with a thermometer, a stirrer, and a condensed water removing device was charged with 387 parts of phthalic anhydride, 337 parts of trimethylolethane, 345 parts of soybean oil fatty acid, and 50 parts of xylene. The reaction system was gradually heated with stirring, and reacted at a temperature of 230° C. for 5 hours until the resin acid value reached 10 or less, to perform the first-stage esterification reaction. Condensed water generated during this period was removed from the reaction system together with xylene vapor. Then, the matter inside the reactor was cooled to 180° C., and further, 152 parts of phthalic anhydride and 230 parts of xylene were added, followed by reacting the mixture for 1 hour at a temperature of 155° C. to carry out the second-stage esterification reaction. Then, the reaction mixture was diluted by the addition of 488 parts of xylene to obtain a high acid value alkyd resin having a solids content of 60% and a resin acid value of 60 (corresponding to 1.23 moles of carboxyl groups). To the alkyd resin were further added 379 parts of bis(tripropyltin) oxide (corresponding to 0.74 mole of bis(tripropyltin) oxide) and 200 parts of xylene. The mixture was reacted for 2 hours at a temperature of 140°-143° C. under reflux while removing condensed water to perform the dehydrocondensation reaction between the high acid value alkyd resin and the bis(tributyltin) oxide. Then, the reaction mixture was diluted with xylene to afford an organotin polymer D having a solids content of 60%.

Tripropyltin groups: 1.2 equivalents/equivalent of —COOH

Tripropyltin group content: 23 wt%/Sn-polymer

Production Example E

A four-necked flask having an internal volume of 5 liters and equipped with a thermometer, a stirrer, and a dropping funnel was charged with 700 parts of xylene. With the temperature of the flask maintained at 60°-65° C., a monomer consisting of 225 parts of styrene, 200 parts of methylmethacrylate, 150 parts of ethyl acrylate, 69 parts of glycidyl methacrylate, and 108 parts of acrylic acid was dripped slowly from the dropping funnel into the flask over the course of about 2 hours. Separately, 12 parts of benzoyl peroxide diluted with 50 parts of xylene was slowly dripped from another dropping funnel over the course of 1 hour to perform the polymerization reaction. Thereby was obtained a high acid value acrylic resin solution having a molecular weight (peak molecular weight of Gell Parmiuation Chromatography) of 20,000, a solids content of 50% and a resin acid value of 125. The resulting acrylic resin solution was added to a mixture of 920 parts of triphenyltin hydroxide and 920 parts of xylene heated to 135° C. The resulting mixture was reacted for 1.5 hours under reflux with dehydration to cause the condensation reaction between the high acid value acrylic resin and the triphenyltin hydroxide, thereby to obtain an organotin polymer E having a solids content of 50%.

Triphenyltin groups: 1.5 equivalents/equivalent of —COOH

Triphenyltin group content: 55 wt%/Sn-polymer

Production Example F

A four-necked flask having an internal volume of 5 liters and equipped with a thermometer, a stirrer, and a dropping funnel was charged with 700 parts of xylene. With the temperature of the flask maintained at 60°-65° C., a monomer consisting of 225 parts of styrene, 200 parts of methyl methacrylate, 150 parts of ethyl acrylate, 69 parts of glycidyl methacrylate, and 108 parts of acrylic acid was dripped slowly from the dropping funnel into the flask over the course of about 2 hours. Separately, 12 parts of benzoyl peroxide diluted with 50 parts of xylene was slowly dripped from another dropping funnel over the course of 1 hour to perform the polymerization reaction. Thereby was obtained a high acid value acrylic resin solution having a molecular weight (peak molecular weight of Gell Parmiuation Chromatography) of 20,000, a solids content of 50% and a resin acid value of 125. The resulting acrylic resin solution was added to a mixture of 499 parts of bis(tributyltin) oxide and 500 parts of xylene heated to 135° C. The resulting mixture was refluxed for 1.5 hours with dehydration to cause the condensation reaction between the high acid value acrylic resin and the bis(tributyltin) oxide, thereby to obtain an organotin polymer F having a solids content of 50%.

Tributyltin groups: 1.0 equivalent/equivalent of —COOH

Tributyltin group content: 39 wt%/Sn-polymer

Production Example G

180 Grams of bis(tributyltin) oxide, 44 g of acrylic acid, and 500 ml of toluene were placed in a 1-liter flask equipped with a thermometer, a stirrer, and a water separator, and heated for 2 hours under reflux. After the reaction, toluene was distilled off. The thus obtained tributyltin acrylate monomer and 70 parts of methyl methacrylate were polymerized for 5 hours at 110°-115° C. with the addition of 2.0 g of benzoyl peroxide as a polymerization initiator catalyst. Then, the resulting product was washed with 15% hydrous methanol to obtain 180 g of a light yellow viscous liquid having an average molecular weight of 8,000. This liquid was made into a varnish having a solids content of 50% with the use of xylol. The varnish was called a organotin polymer G.

Tributyltin groups: 1 equivalent/equivalent of —COOH

Tributyltin group content: 67 wt%/Sn-polymer

Production Example H

A mixture consisting of 70 parts of Tohmide 225 (polyamide produced by Fuji Kasei K. K.; amine value 300), 96 parts of triphenyltin hydroxide and 300 parts of xylene was reacted for 3 hours at 135° C. to obtain an organotin polymer H having a solids content of 35%.

Triphenyltin groups: 0.7 equivalent based on hydrogen contained in $NH_2$

Triphenyltin group content: 57 wt% based on Sn-polymer

Production Example I

A four-necked flask having an internal volume of 2 liters and equipped with a stirrer, a thermometer, a water separator, and a cooler was charged with 367 parts of triphenyltin hydroxide, 86 parts of methacrylic acid and 340 parts of toluene, and they were heated granually. When two hours passed since the initiation of heating under reflux, the heating was terminated, followed by cooling the reaction mixture to room temperature. Condensed water obtained at this time was in an amount of 17.0 parts. Solvent in the resulting product was removed under reduced pressure, whereafter the infrared absorption spectrum of the residue was examined, thereby confirming that the residue was triphenyltin methacrylate.

Then, a four-necked flask having an internal volume of 2 liters and equipped with a thermometer, a stirrer and a dropping funnel was charged with 200 parts of xylene. With the flask maintained at a temperature of 85°-90° C., a monomer composed of 800 parts of the above-mentioned triphenyltin methacrylate (solids content: 55%), 100 parts of methyl methacrylate and 50 parts of styrene was dripped slowly from the dropping funnel into the flask over the course of 2 hours. Separately, 0.3 part of benzoyl peroxide diluted with 30 parts of toluene was dripped slowly from another dropping funnel over the course of 1 hour to perform the polymerization reaction. After dripping of the monomer, the reaction was continued for 6 hours at the aforementioned temperature, to afford a triphenyltin-containing organotin polymer I having a solids content of 50%.

Triphenyltin groups: 1 equivalent/equivalent of —COOH

Triphenyltin group content: 62 wt%/Sn-polymer

Production Example J

An alkyd resin manufacturing closed reactor equipped with a thermometer, a stirrer, and a condensed water removing device was charged with 300 parts of phthalic anhydride, 340 parts of trimethylolethane, 345 parts of linseed oil fatty acid, 100 parts of Epikote #1001 resin, and 50 parts of xylene. The reaction system was gradually heated with stirring, and reacted at a temperature of 240° C. for 5 hours until the resin acid value reached 10, to perform the first-stage esterification reaction. Then, the matter inside the reactor was cooled to 180° C., and further, 460 parts of phthalic anhydride and 230 parts of xylene were added, followed by reacting the mixture for 1 hour at a temperature of 155° C. to carry out the second-stage esterification reaction. Thereby was obtained a high acid value alkyl resin having a resin acid value of 120 (corresponding to 3.12 moles of carboxyl groups), and this resin was diluted by the addition of 400 parts of xylene. To the diluted alkyd resin solution were added 1,718 parts of triphenyltin hydroxide (corresponding to 4.68 moles of triphenyltin hydroxide) and 700 parts of xylene. The mixture was reacted for 3 hours at a temperature of 140°-143° C. under reflux while removing condensed water to perform the dehydrocondensation reaction between the high acid value epoxy modified alkyd resin and the triphenyltin hydroxide. Then, the reaction mixture was diluted with xylene to afford an organotin polymer J having a solids content of 55%.

Triphenyltin groups: 1.5 equivalents/equivalent of —COOH

Triphenyltin group content: 54 wt%/Sn-polymer

Production Example K

A four-necked flask equipped with a thermometer, a stirrer, and a condensed water removing device was charged with 1080 parts of PBC-1000 (polybutadiene, a product of Nippon Soda Co., Ltd.), 154 parts of maleic anhydride, and 50 parts of xylene. The reaction system was heated gradually with stirring and reacted at a temperature of 190° C. for about 4 hours. Then, the system inside the reactor was cooled to 150° C., and 32 g of water and 1060 parts of xylene were added. The mixture was reacted at 120° C. for 1 hour for ring opening of the maleic anhydride groups, thereby obtaining a high acid value maleic polybutadiene resin solution having a resin acid value of 130 (corresponding to 2.93 moles of carboxyl groups). To this maleic polybutadiene resin solution was added 807 parts of bis(tributyltin) oxide (corresponding to 1.32 moles of bis(tributyltin) oxide). The mixture was refluxed for 2 hours at a temperature of 140°-143° C. while removing condensed water to perform the dehydrocondensation reaction between the high acid value maleic polybutadiene and the bis(tributyltin) oxide, thereby obtaining an organotin polymer K having a solids content of 75%.

Tributyltin groups: 0.9 equivalent/equivalent of —COOH

Tributyltin group content: 39 wt%/Sn-polymer

PREPARATION OF PAINT

Examples 1 to 15 and Comparative Examples 1 to 8

Copper antifoulant, coloring pigment, vehicle resin, auxiliary antifouling agent, etc. in the proportions shown in Table 1 below were blended with each of the organotin polymers A to K obtained in the Production Examples A to K, thereby to prepare an antifouling paint. In this case, the respective components indicated in columns A and B of Table 1 were first compounded into separate packages, and these two packages were then mixed together before coating, thereby preparing an antifouling paint ready for application.

TABLE 1

| | | Example 1 | | Example 2 | | Example 3 | | Example 4 | | Example 5 | | Example 6 | | Example 7 | | Example 8 | | Example 9 | | Example 10 | | Example 11 | |
| | | A | B | A | B | A | B | A | B | A | B | A | B | A | B | A | B | A | B | A | B | A | B |
|---|---|---|---|---|---|---|---|---|---|---|---|---|---|---|---|---|---|---|---|---|---|---|---|
| Sn-polymer | A | 25 | | | | | | | | | | | | | | | | 30 | | | | | |
| | B | | | | 40 | | | | | | | | | | | | | | 30 | | | | |
| | C | | | | | 15 | | | | | | | | | | | | | | | | | |
| | D | | | | | | | 18 | | | | | | | | | | | | | | | |
| | E | | | | | | | | | | 40 | | | | | | | | | | | | |
| | F | | | | | | | | | | | 43 | | | | | | | | | | | |
| | G | | | | | | | | | | | | | | 45 | | | | | | | 50 | |
| | H | | | | | | | | | | | | | | | | 40 | | | | | | |
| | I | | | | | | | | | | | | | | | | | | | | | | |
| | J | | | | | | | | | | | | | | | | | | | | | | |
| | K | | | | | | | | | | | | | | | | | | | | | | |
| Copper anti-foulant | Cuprous oxide | | 55 | | 30 | | 45 | | 60 | | | | | | 35 | | 20 | | 20 | | 20 | | 25 |
| | Copper thiocyanate | | | | | | | | | | 30 | | | | | | 20 | | | | | | |
| | Metallic copper | | | | | | | | | | | | 30 | | | | | | | | | | |
| Coloring | Red iron oxide | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| | Zinc oxide | | | | 5 | | 3 | | | | 5 | | | | | | | | 10 | | | | |

TABLE 1-continued

| | | | | | | | | | | | | | | | | | | | | | |
|---|---|---|---|---|---|---|---|---|---|---|---|---|---|---|---|---|---|---|---|---|---|
| pigment | Talc | | | | | | | 5 | | | | 5 | | | | | | | |
| Vehicle Resin | Rosin | 7 | | 6 | 2 | 6 | 10 | 5 | 5 | | 7 | | | | | | | 1 | 6 |
| | Rosin ester(*1) | | | | | | | | | | | 3 | 5 | | | | | | |
| | Acrylic resin A (*2) | | | | | | | | | | | | | 2 | 5 | | | | |
| Acrylic resin B | (*3) | | | | | | | | | | | | | | | | | | |
| | Vinyl resin (*4) | | | | | | | | | | | | | | | | | | |
| | Epikote 1001 (*5) | | | | | | | | | | | 7 | | | | | | | |
| | CR-20 (*6) | | | | | | | | | | | | | | | | | | |
| | Dioctyl phthalate | | | | | 2 | | | | | | | | | | 3 | | | |
| | Tricresyl phosphate | 1 | | 1 | | | 2 | 1 | 2 | | 2 | | | 1 | | | | | 1 |
| | Triphenyl phosphate | | | | | 1 | | | | | | | | | | | | | |
| Auxiliary Antifoulant | Triphenyltin hydroxide | | | 5 | | | | 7 | | | | | 10 | | 15 | | | | |
| | Tributyltin flouride | | | | 10 | | | | | | | 3 | 5 | | | | | | 5 |
| | Zinc dimethyl dithiocarbamate | | | | | | | | | | | | | | | | | | |
| Solvent | Xylene | 3 | 5 | 3 | 6 | 6 | 7 | 5 | 6 | 7 | 6 | 3 | 4 | 5 | 10 | 2 | 6 | 10 | 2 | 6 |
| | Methyl isobutyl ketone | | | | | | | | | | | | | 3 | | | | | | |
| | n-Butanol | | | | | | | | | | | | | 1 | | | | | | |
| | Total | 30 | 70 | 50 | 50 | 35 | 65 | 20 | 80 | 55 | 45 | 45 | 55 | 50 | 50 | 45 | 55 | 60 | 40 | 45 | 55 | 55 | 45 |

| | | Example | | | | | | | | Comparative Example | | | | | | | |
|---|---|---|---|---|---|---|---|---|---|---|---|---|---|---|---|---|---|
| | | 12 | | 13 | | 14 | | 15 | | | | | | | | | |
| | | A | B | A | B | A | B | A | B | 1 | 2 | 3 | 4 | 5 | 6 | 7 | 8 |
| Sn-polymer | A | | | | | 40 | | 40 | | 30 | | | | | | | |
| | B | | | | | | | | | | 41 | | | | 30 | | |
| | C | | | | | | | | | | | | | | | | |
| | D | | | | | | | | | | | | | | | | |
| | E | | | | | | | | | | | 30 | | | | | |
| | F | | | | | | | | | | | | | | | | |
| | G | | | | | | | | | | | | | 45 | | 45 | |
| | H | | | | | | | | | | | | | | | | |
| | I | | | | | | | | | | | | 33 | | | | |
| | J | 40 | | | | | | | | | | | | | | | 40 |
| | K | | | 30 | | | | | | | | | | | | | |
| Copper antifoulant | Cuprous oxide | | 30 | | 40 | | 25 | | 30 | 30 | 35 | 45 | 35 | 40 | 30 | 35 | 40 |
| | Copper thiocyanate | | | | | | | | | | | | | | | | |
| | Metallic copper | | | | | | | | | | | | | | | | |
| Coloring pigment | Red iron oxide | 2 | 2 | 2 | | 2 | 2 | 2 | 2 | 4 | 4 | 4 | 4 | 4 | 4 | 4 | 4 |
| | Zinc oxide | | | | | | 3 | | | | | | | | | | |
| | Talc | | | | 3 | | | 5 | 5 | | | | | 5 | 5 | 5 | 5 |
| Vehicle | Rosin | | | | | | | | | 7 | 7 | 7 | 7 | 7 | | | |
| | Rosin ester (*1) | | | | | | | | | | | | | | | | |
| | Acrylic resin A (*2) | | | | | | | | | | | | | | | | |
| | Acrylic resin B (*3) | | 5 | | | | | | | | | | | | | | |
| | Vinyl resin (*4) | | | 2 | 5 | | | | | | | | | | | | |
| | Epikote 1001 (*5) | | | | | | | | | | | | | | | | |
| | CR-20 (*6) | | | | | 1 | 7 | | | | | | | | | | |
| | Dioctyl phthalate | | | | | | | | | | | | | | | | |
| | Tricresyl phosphate | | | 1 | | 3 | | | 6 | 1 | 1 | 1 | 1 | 2 | 1 | 1 | 2 |
| | Triphenyl phosphate | | | | | | | | | | | | | | | | |
| Auxiliary Antifoulant | Triphenyltin hydroxide | | 5 | | | | | | | | 5 | | | | | | |
| | Tributyltin flouride | | | | 5 | | | | | | | 5 | | | | | |
| | Zinc dimethyl dithiocarbamate | 15 | | | | | | | | | | | | | | | |
| Solvent | Xylene | 3 | 3 | 3 | 4 | 4 | 5 | 2 | 7 | 28 | 7 | 8 | 8 | 11 | 30 | 10 | 16 |
| | Methyl isobutyl ketone | | | 3 | 3 | | | | | | | | | | | | |
| | n-Butanol | | | | | | | | | | | | | | | | |
| | Total | 60 | 40 | 45 | 55 | 55 | 45 | 50 | 50 | 100 | 100 | 100 | 100 | 100 | 100 | 100 | 100 |

Note
(*1)Rosin ester: Triesterification product of 3 moles of rosin with 1 mole of glycerin
(*2)Acrylic resin A: Copolymer composed of 40 wt% of methyl methacrylate, 40 wt% of n-butyl acrylate and 20 wt% of styrene number average molecular weight about 4,000
(*3)Acrylic resin B: Copolymer composed of 40 wt% of methyl methacrylate, 5 wt% of 2-hydroxyethyl methacrylate, 40 wt% of n-butyl acrylate and 15 wt% of styrene; number average molecular weight about 5,000
(*4)Vinyl resin: Laroflex MP 45 (tradename for a product of B.A.S.F. Company)
(*5)Epikote 1001: Tradename for a product of Shell Chemical Co.
(*6)Cr-20: Tradename for a product of Asahi Denka Kogyo Co. (Chlorinated rubber resin)

Results of performance test

The antifouling paints obtained in Examples 1 to 15 and Comparative Examples 1 to 8 were tested for storage stability, state of coated film dipped in seawater, and antifouling properties in seawater. The results are listed in Table 2 below.

[Testing method]

(1) The storage test was conducted by placing about 400 ml of each paint sample in a glass bottle having a volume of 500 ml, sealing the bottle, and allowing it to stand at a constant temperature of 50° C. to examine the change in viscosity, etc. with the passage of time.

(2) The test for the state of coated film was conducted as follows: A test plate of 3.2×300×150 m/m, which had previously been provided with an anticorrosive coating, was coated twice with each paint sample, which had been stored for 1 month at 50° C., by means of a brush such that a coated film formed by each application had a thickness of 40μ in the dry condition, whereby a test plate was made. This test plate was dipped in seawater of Toba Bay, Mie Prefecture, Japan to examine the state of the coated film after a lapse of 6 months (e.g. whether or not cracks occurred).

(3) The test for antifouling properties in seawater was conducted by dipping a test plate, prepared in the same way as in the test (2) above, in seawater of Toba Bay, Mie Prefecture, Japan to examine the antifouling effect. The figure (%) in Table 2 shows the area (%) of deposition of barnacles, seaweeds, etc. with respect to the surface area of the test plate.

TABLE 2

| | Storage stability | | State of coated film | Antifouling properties in seawater | | | | | | | |
|---|---|---|---|---|---|---|---|---|---|---|---|
| | | | | Deposition of barnacles (%) | | | | Deposition of seaweeds (%) | | | |
| | 1 month | 3 months | | 0.5 | 1 | 1.5 | 2(year) | 0.5 | 1 | 1.5 | 2(year) |
| Example | | | | | | | | | | | |
| 1 | No change | No change | No change | 0 | 0 | 0 | 0 | 0 | 0 | 0 | 0 |
| 2 | No change | No change | No change | 0 | 0 | 0 | 0 | 0 | 0 | 0 | 0 |
| 3 | No change | No change | No change | 0 | 0 | 0 | 0 | 0 | 0 | 0 | 0 |
| 4 | No change | No change | No change | | | | | | | | |
| 5 | No change | No change | No change | 0 | 0 | 0 | 0 | 0 | 0 | 0 | 0 |
| 6 | No change | No change | No change | 0 | 0 | 0 | 0 | 0 | 0 | 0 | 0 |
| 7 | No change | No change | No change | 0 | 0 | 0 | 0 | 0 | 0 | 0 | 0 |
| 8 | No change | No change | No change | 0 | 0 | 0 | 0 | 0 | 0 | 0 | 5 |
| 9 | No change | No change | No change | 0 | 0 | 0 | 0 | 0 | 0 | 0 | 0 |
| 10 | No change | No change | No change | 0 | 0 | 0 | 0 | 0 | 0 | 0 | 5 |
| 11 | No change | No change | No change | 0 | 0 | 0 | 0 | 0 | 0 | 0 | 0 |
| 12 | No change | No change | No change | 0 | 0 | 0 | 0 | 0 | 0 | 0 | 5 |
| 13 | No change | No change | No change | 0 | 0 | 0 | 0 | 0 | 0 | 0 | 0 |
| 14 | No change | No change | No change | 0 | 0 | 0 | 0 | 0 | 0 | 0 | 0 |
| 15 | No change | No change | No change | 0 | 0 | 0 | 0 | 0 | 0 | 0 | 0 |
| Comparative Example | | | | | | | | | | | |
| 1 | Somewhat thickened | Gelled | No change | 1 | 5 | 15 | 50 | 3 | 10 | 50 | 100 |
| 2 | Somewhat thickened | Gelled | No change | 1 | 5 | 15 | 55 | 2 | 13 | 55 | 100 |
| 3 | Gelled | — | No change | 1 | 5 | 15 | 50 | 4 | 10 | 45 | 100 |
| 4 | Gelled | — | No change | 1 | 5 | 10 | 40 | 3 | 8 | 40 | 100 |
| 5 | Gelled | — | No change | 2 | 7 | 20 | 60 | 4 | 20 | 60 | 100 |
| 6 | Gelled | — | Some cracks occurred | 0 | 5 | 15 | 55 | 0 | 15 | 55 | 100 |
| 7 | Gelled | — | Many cracks occurred | 0 | 5 | 15 | 50 | 0 | 13 | 50 | 100 |
| 8 | Gelled | — | Many cracks occurred | 0 | 7 | 20 | 65 | 0 | 20 | 60 | 100 |

What we claim is:

1. In an antifouling paint comprising an organotin polymer, an antifoulant copper compound and a vehicle resin, the improvement wherein said paint comprises Component A containing said organotin polymer, and Component B containing said copper compound and said vehicle resin, and said Component A is in a first package separate from component B, and said Component B is in a second and separate package, said first and second packages being adapted to permit mixing of said Components A and B within two weeks prior to application of said paint to a substrate, with the proviso that said Component A does not contain any of said copper compound, and said Component B does not contain any of said organotin polymer.

2. The paint of claim 1 wherein
   said organotin polymer is selected from the group consisting of
   (A) a compound of the structure in which a triphenyltin group derived from a triphenyltin compound, or a trialkyltin group derived from a trialkyltin compound, is bonded to a functional polymer selected from the group consisting of an alkyd resin having an acid value of 30 to 300, an epoxy-modified alkyd resin having an acid value of 30 to 300, a carboxyl-containing vinyl homo- or copolymer having an acid value of 30 to 300 and a number average molecular weight of from about 1,000 to about 70,000, and a polyamide resin having an amine value of 70 to 800, and
   (B) an organotin homo- or copolymer containing units derived from a polymerizable compound, said compound being of the structure in which a triphenyltin group derived from a triphenyltin compound, or a trialkyltin group derived from a trialkyltin compound, is bonded to a carboxyl group-containing vinyl monomer,
   said vehicle resin comprises at least one film-forming hydrophobic or hydrophilic vehicle resin and/or a plasticizer, said film-forming resin being selected from the group consisting of a natural resin, an alkyd resin, an epoxy ester resin, a vinyl resin, an epoxy resin, a phenolic resin and a rubber resin, and
   said copper antifoulant is selected from the group consisting of cuprous oxide, copper thiocyanate, copper sulfate, copper oleate, copper rosinate, copper glycinate, metallic copper, copper alloy powder, cuprous chloride, cupric hydroxide and basic cupric carbonate.

3. The paint of claim 2 wherein said Component A further contains a triphenyltin compound and/or trialkyltin compound as auxiliary antifouling ingredient.

4. The paint of claim 2 wherein said Component A contains said organotin polymer and a triphenyltin compound as antifouling ingredients, and a vehicle resin other than carboxyl group-containing resins.

5. The paint of claim 2 wherein said Component A contains said organotin polymer and a trialkyltin compound as antifouling ingredients, and a vehicle resin.

6. The paint of claim 2 wherein said Component A contains said organotin polymer as antifouling ingredient and a vehicle resin, and wherein said Component B comprises said copper compound, a triphenyltin compound and a vehicle resin other than carboxyl group-containing resins.

7. The paint of claim 2 wherein said Component A contains said organotin polymer as antifouling ingredient and a vehicle resin, and wherein said Component B comprises said copper compound, a trialkyltin compound and a vehicle resin.

8. The paint of claim 2 wherein said carboxyl group-containing vinyl monomer is a monobasic or dibasic acid having at least one ethylenically unsaturated bond.

9. The paint of any one of claims 3, 4, 6 and 2 wherein said triphenyltin compound is expressed by the formula

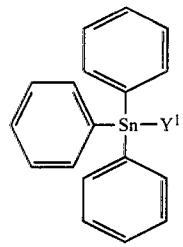
(I)

in which $Y^1$ represents —OH, halogen,

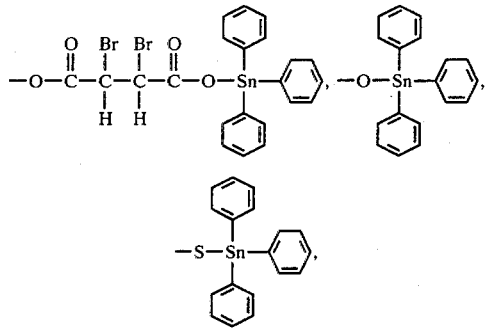

or a residue of a mono- or dibasic acid with 1 to 18 carbon atoms or halogenated derivative thereof.

10. The paint of any one of claims 3, 5, 7 and 2 wherein said trialkyltin compound is expressed by the formula

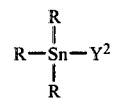
(II)

in which R represents alkyl having 1 to 6 carbon atoms, and $Y^2$ represents —OH, halogen,

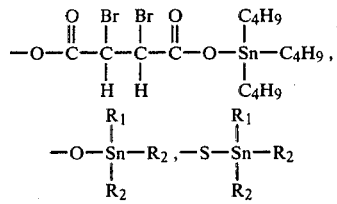

or a residue of a mono- or dibasc acid with 1 to 18 carbon atoms or a halogenated derivative thereof, and each of $R_1$, $R_2$ and $R_3$ represents alkyl of 1 to 6 carbon atoms.

11. The paint of claim 2 wherein said organotin polymer is a reaction product obtained by reacting said triphenyltin compound or said trialkyltin compound with said alkyd resin or said epoxy-modified alkyd resin in a proportion of 0.5 to 3.0 equivalents of said triphenyltin compound or said trialkyltin compound per equivalent —COOH group contained in said alkyd resin or said epoxy-modified alkyd resin.

12. The paint of claim 2 wherein said organotin polymer is a reaction product obtained by reacting said triphenyltin compound or said trialkyltin compound with said carboxyl-containing vinyl homo- or copolymer in a proportion of 0.5 to 3.0 equivalents of said triphenyltin compound or said trialkyltin compound per equivalent of —COOH group contained in said carboxyl-containing vinyl homo- or copolymer.

13. The paint of claim 2 wherein said organotin polymer is a reaction product obtained by reacting said triphenyltin compound or said trialkyltin compound with said polyamide resin in a proportion of 0.3 to 2 equivalents of said triphenyltin compound or said trialkyltin compound per equivalent of the hydrogen atom of —NH$_2$ or —NH group contained in said polyamide resin.

14. The paint of any one of claims 11 to 13 wherein said organotin polymer contains 5 to 85% by weight, based on the weight of the polymer, of said triphenyltin or trialkyltin group.

15. The paint of any one of claims 3, 1 and 2 wherein each of said vehicle resin, has a dissolving rate of not more than 1500 μg/cm$^2$/day at 25° C. in seawater.

16. The paint of any one of claims 3, to 7, 1 and 2 wherein said copper compound in Component B is cuprous oxide, copper thiocyanate or metallic copper.

17. The paint of any one of claims 3, 4, 7, 1 and 2 wherein said vehicle resin in Component B comprises rosin.

18. The paint of claim 2 wherein said film-forming resin is selected from the group consisting of rosin, a rosin derivative, an acrylic resin, a diene resin, an olefin resin, a petroleum resin and a coumarone-indene resin.

19. The paint of claim 9 wherein said triphenyltin compound is selected from the group consisting of triphenyltin hydroxide, triphenyltin chloride, triphenyltin fluoride, triphenyltin bromide, triphenyltin iodide, triphenyltin acetate, triphenyltin monochloroacetate, triphenyltin phthalate, triphenyltin maleate, triphenyltin fumarate, triphenyltin octinate, triphenyltin stearate, triphenyltin nicotinate, triphenyltin versatate, bis-(triphenyltin) dibromosuccinate, bis-(triphenyltin) oxide and bis-(triphenyltin) sulfide.

20. The paint of claim 10 wherein said trialkyltin compound is selected from the group consisting of bis-(trimethyltin) oxide, trimethyltin chloride, bis-(triethyltin) oxide, triethyltin chloride, triethyltin fluoride, bis-(tripropyltin) oxide, tripropyltin chloride, tripropyltin fluoride, tributyltin chloride, tributyltin fluoride, tributyltin bromide, tributyltin iodide, tributyltin acetate, bis-(tributyltin) oxide, bis-(tributyltin) sulfide, tributyltin monochloroacetate, tributyltin stearate, tributyltin fumarate, tributyltin maleate, bis-tributyltin) dibromosuccinate, tributyltin nicotinate, bis-(tricyclohexyltin) oxide, bis-(tricyclohexyltin) sulfide, tricyclohexyltin hydroxide, tricyclohexyltin fluoride, tricyclohexyltin chloride and tricyclohexyltin acetate.

21. The paint of claim 2 whereiin said alkyd resin is component (A) is an esterification product of a polybasic acid component and a polyhydric alcohol component, or an esterification product of a polybasic acid component, a polyhydric alcohol component and a drying or semidrying oil fatty acid.

22. The paint of claim 2 wherein said epoxy-modified alkyd resin is selected from the group consisting of (i) a polycondensation product of a polybasic acid component and an epoxy resin, (ii) a polycondensation product of a polybasic acid component, an epoxy resin and a polyhydric alcohol component, and (iii) one of said poly-condensation products having incorporated therein a drying or semidrying oil fatty acid.

23. The paint of claim 2 wherein said polyamide resin is (i) an aliphatic polyamine selected from the group consisting of ethylenediamine, diethylenetriamine, triethylenetetramine, tetraethylenepentamine and diethylaminopropylamine, (ii) an aromatic polyamine selected from the group consisting of m-phenylenediamine, p,p'-diaminodiphenylmethane and p,p'-diaminodiphenylsulfone, or (iii) a polycondensation product of said polyamine (i) or (ii) with a polycarboxylic acid selected from the group consisting of a dimer acid, adipic acid, maleic acid and phthalic acid.

24. The paint of claim 8 wherein said monobasic acid is selected from the group consisting of acrylic acid, methacrylic acid, crotonic acid, vinylbenzoic acid and vinylacetic acid, and said dibasic acid is selected from the group consisting of maleic acid, maleic anhydride, fumaric acid, succinic acid, citraconic acid, mesaconic acid, itaconic acid and aconitic acid.

25. The paint of claim 18 wherein said rosin derivative is (i) a rosinate of rosin with a metal selected from the group consisting of Ca, Mg, Zn and Mn, or (ii) an ester of rosin and a monohydric alcohol, a polyol or a polymer containing an alcohol ingredient.

26. The paint of claim 2 wherein said natural resin is selected from the group consisting of shellac, copal, dammar, bengal, gelatin, starch and gloiopeltis.

27. The paint of claim 18 wherein said acrylic resin is a non-functional acrylic resin or an acrylic resin having a functional group selected from the group consisting of —OH, —COOH, —NH, —NH$_2$ and

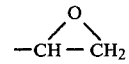

in its molecule.

28. The paint of claim 2 wherein said alkyd resin, as the film-forming resin, is an esterification product of a polybasic acid component and a polyhydric alcohol component, or an esterification product of a polybasic acid component, a polyhydric alcohol component and a drying or semidrying oil fatty acid.

29. The paint of claim 2 wherein said epoxy ester resin is an esterification product between an epoxy resin and a monobasic acid.

30. The paint of claim 2 wherein said vinyl resin is a homopolymer of a vinyl monomer selected from the group consisting of vinyl chloride, vinylidene chloride, vinyl acetate, vinyl propionate, styrene and acrylonitrile; a copolymer of said vinyl monomers with one another; a copolymer of at least one of said vinyl monomers in an amount of at least 50 weight %, with another copolymerizable monomer selected from the group consisting of ethylene, propylene, butadiene and vinyl isobutyl ether; or a polyvinyl butyral resin.

31. The paint of claim 18 wherein said diene resin contains at least 10 weight % of butadiene, isoprene or chloroprene units.

32. The paint of claim 18 wherein said olefin resin contains at least 20 weight % of ethylene or propylene units.

33. The paint of claim 2 wherein said epoxy resin has a molecular weight of about 300 to about 8000.

34. The paint of claim 2 wherein said phenolic resin is a rosin-modified phenolic resin, or a resol type or novolak type phenolic or alkyl phenol resin.

35. The paint of claim 2 wherein said rubber resin is a chlorinated rubber or a cyclized rubber.

* * * * *

UNITED STATES PATENT AND TRADEMARK OFFICE
CERTIFICATE OF CORRECTION

PATENT NO. : 4,270,953

DATED : June 2, 1981

INVENTOR(S) : Keizo NAKAGAWA; Katsushi YAMANO; Takashi WATANABE; Kunio YAMAMOTO and Shigeo INOMATA It is certified that error appears in the above-identified patent and that said Letters Patent are hereby corrected as shown below:

Column 4, line 15, delete "ample,".

Column 8, line 26, change "Only" to --Any--.

Column 15, line 30, change "tributyltin" to --tripropyltin--.

Column 17, line 41, change "alkyl" to --alkyd--.

In Table 1, at the bottom of columns 17 and 18, move "43" from Example 5B to Example 6A, for Sn-polymer F.

In Table 1, at the bottom of columns 17 and 18, move "50" from Example 10B to Example 11A, for Sn-polymer F.

In Table 1-continued at the top of columns 19 and 20, move "Acrylic resin B" to the right so that it is in line under "(*2)".

UNITED STATES PATENT AND TRADEMARK OFFICE
CERTIFICATE OF CORRECTION

PATENT NO. : 4,270,953
DATED : June 2, 1981
INVENTOR(S) : Keizo NAKAGAWA; Katsushi YAMANO; Takashi WATANABE; Kunio YAMAMOTO and Shigeo INOMATA It is certified that error appears in the above-identified patent and that said Letters Patent are hereby corrected as shown below:

In Note (2*) toward the bottom of columns 19 and 20, insert --;-- after "styrene".

Column 24, line 13, after "halogen," insert

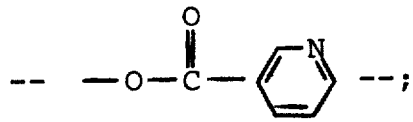

line 63, after "equivalent" insert --of--.

Column 25, line 13, after "claims" insert --2 and--;

line 17, change "3" to --3 to 7--;

line 18, change "resin" to --resins--;

UNITED STATES PATENT AND TRADEMARK OFFICE
CERTIFICATE OF CORRECTION

PATENT NO. : 4,270,953

DATED : June 2, 1981

INVENTOR(S) : Keizo NAKAGAWA; Katsushi YAMANO; Takashi WATANABE; Kunio YAMAMOTO and Shigeo INOMATA It is certified that error appears in the above-identified patent and that said Letters Patent are hereby corrected as shown below:

Column 25, line 20, delete the comma (,) after "3";

line 55, change "whereiin" to --wherein--; change "is" to --in--.

Signed and Sealed this

Twenty-seventh Day of April 1982

[SEAL]

Attest:

GERALD J. MOSSINGHOFF

Attesting Officer

Commissioner of Patents and Trademarks